US012646239B2

(12) United States Patent
Krans et al.

(10) Patent No.: US 12,646,239 B2
(45) Date of Patent: Jun. 2, 2026

(54) AUTOMATED THERAPY COMPLIANCE VIDEO WITH AVATAR EXPLAINING COMPLIANCE DATA

(71) Applicant: KONINKLIJKE PHILIPS N.V., Eindhoven (NL)

(72) Inventors: Jan Martijn Krans, Den Bosch (NL); Heereen Shim, Eindhoven (NL); Bas Luksenburg, Eindhoven (NL); Boris Emmanuel Rachmund De Ruyter, Peer (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 143 days.

(21) Appl. No.: 18/237,492

(22) Filed: Aug. 24, 2023

(65) Prior Publication Data

US 2024/0070952 A1     Feb. 29, 2024

(30) Foreign Application Priority Data

Aug. 26, 2022     (EP) .................................... 22192450

(51) Int. Cl.
*G06T 13/40*               (2011.01)
(52) U.S. Cl.
CPC ................................... *G06T 13/40* (2013.01)
(58) Field of Classification Search
None
See application file for complete search history.

(56) References Cited

U.S. PATENT DOCUMENTS

| | | | | |
|---|---|---|---|---|
| 10,586,369 B1 * | 3/2020 | Roche | .................. | G06T 13/205 |
| 10,943,407 B1 * | 3/2021 | Morgan | ................ | G16H 15/00 |
| 11,923,058 B2 * | 3/2024 | Dohrmann | .............. | H04L 67/55 |
| 2015/0265209 A1 * | 9/2015 | Zhang | ................... | G16H 20/30 |
| | | | | 600/509 |
| 2016/0086500 A1 * | 3/2016 | Kaleal, III | ............... | A61B 5/20 |
| | | | | 434/257 |
| 2018/0166164 A1 * | 6/2018 | Sysko | .................... | G16H 20/10 |
| 2020/0335190 A1 * | 10/2020 | Chung | ................. | A61B 5/0022 |
| 2021/0001174 A1 * | 1/2021 | Kantorovich | .......... | G06V 40/23 |

(Continued)

FOREIGN PATENT DOCUMENTS

| | | |
|---|---|---|
| WO | 2021216881 A1 | 10/2021 |
| WO | 2022115040 A1 | 6/2022 |

*Primary Examiner* — Hilina K Demeter
(74) *Attorney, Agent, or Firm* — Brynne J. Corcoran

(57)     ABSTRACT

Systems, apparatuses and methods provide technology for generating a video presentation, including determining a plurality of insights, each insight associated with a data presentation and, based on at least a portion of therapy compliance data for a patient, determining, for each insight, an insight location on a reporting dashboard and an avatar position for an avatar on the reporting dashboard, formulating a feedback message for each of the insights, and generating a video presentation based on the reporting dashboard, the video presentation including a display of the data presentations and a display of an animation sequence for the avatar, the animation sequence including, for each insight, a display of the avatar at the respective avatar position, the avatar pointing to the insight location for the insight, and a synchronized audio signal representing the feedback message for the insight.

14 Claims, 7 Drawing Sheets

(56)           References Cited

U.S. PATENT DOCUMENTS

| | | | |
|---|---|---|---|
| 2021/0134426 A1* | 5/2021 | Mason | G16H 50/70 |
| 2022/0367042 A1* | 11/2022 | Page | G06F 3/04847 |
| 2023/0172510 A1* | 6/2023 | Alford | A61B 5/167 |
| | | | 434/236 |
| 2024/0028106 A1* | 1/2024 | Elor | G06T 19/006 |

* cited by examiner

300

| Map data presentations on dashboard 310 | Extract insights per data presentation 320 | Assign weights to insights 330 |
|---|---|---|
| Determine avatar position on dashboard 340 | Determine map coordinates per insight 350 | Formulate each insight as feedback message 360 |

Generate feedback video presentation for delivery to patient
370

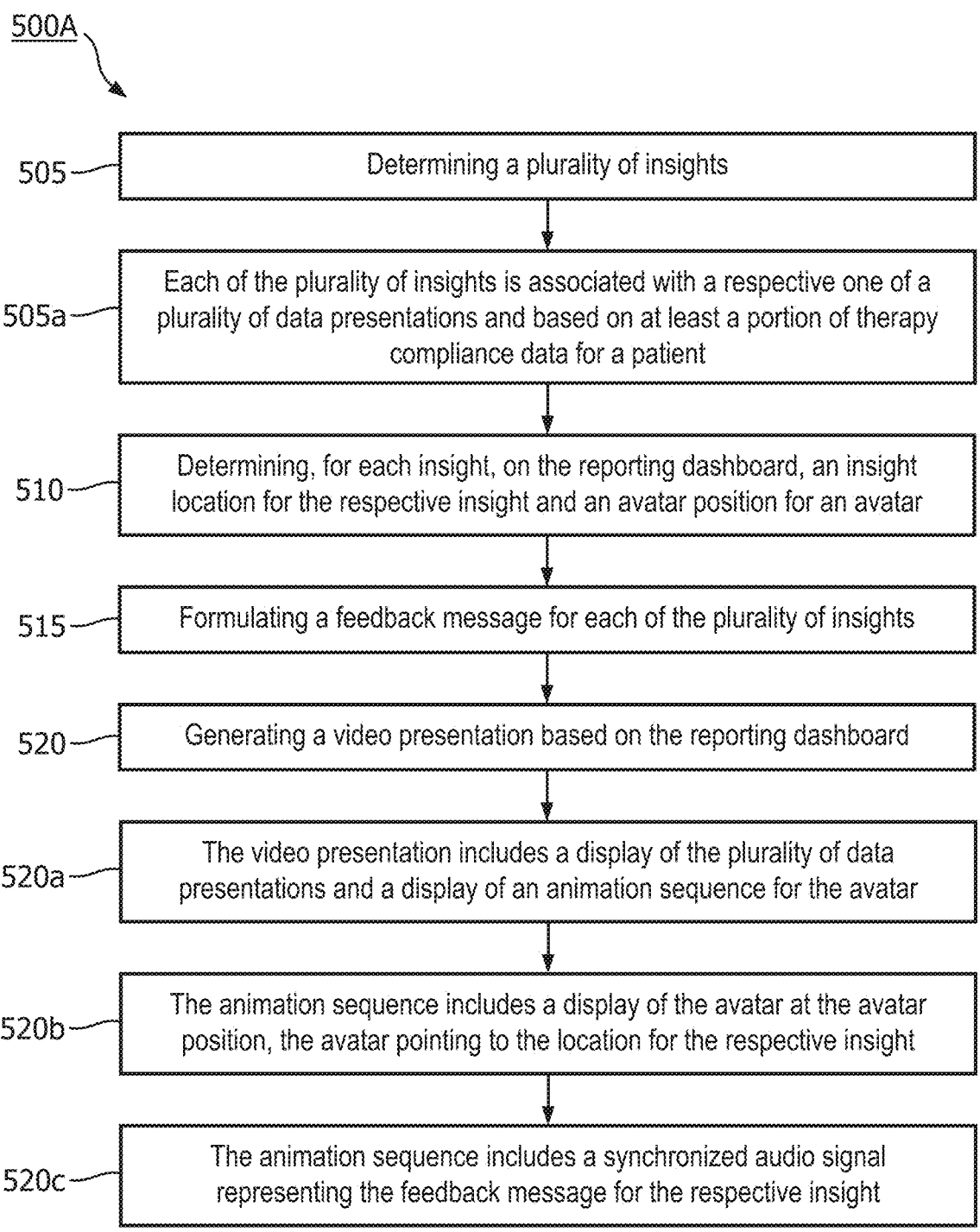

500A

505 — Determining a plurality of insights

505a — Each of the plurality of insights is associated with a respective one of a plurality of data presentations and based on at least a portion of therapy compliance data for a patient 510 — Determining, for each insight, on the reporting dashboard, an insight location for the respective insight and an avatar position for an avatar 515 — Formulating a feedback message for each of the plurality of insights 520 — Generating a video presentation based on the reporting dashboard 520a — The video presentation includes a display of the plurality of data presentations and a display of an animation sequence for the avatar 520b — The animation sequence includes a display of the avatar at the avatar position, the avatar pointing to the location for the respective insight 520c — The animation sequence includes a synchronized audio signal representing the feedback message for the respective insight

FIG. 5A

AUTOMATED THERAPY COMPLIANCE VIDEO WITH AVATAR EXPLAINING COMPLIANCE DATA

CROSS REFERENCE TO RELATED APPLICATION

This application claims the benefit of European Patent Application No. 22192450.9, filed Aug. 26, 2022. This application is incorporated by reference herein.

TECHNICAL FIELD

Embodiments generally relate to computing technology. More particularly, embodiments relate to enhanced feedback technology for automated therapy compliance programs.

BACKGROUND

Medically based therapy programs typically require therapy compliance by the patient to be effective, particularly for patients with chronic conditions. Automated therapy programs can provide periodic feedback on therapy compliance (e.g., over a period such as a number of weeks), such as compliance data in the form of graphs, charts or diagrams, delivered via a variety of digital channels such as e-mail messages, text messages, or in-app feeds. For example, automated adherence programs for positive airway pressure (e.g., CPAP) therapy can provide periodic feedback in the form of compliance graphs for device usage data showing specific therapy compliance metrics such as nightly usage, mask fit and hours worn per night.

However, feedback provided by current therapy compliance programs is difficult for patients to digest. For example, therapy compliance reports as regular performance feedback for patients can be complicated to read, with multiple graphs on different types of compliance metrics. Additionally, such reports are data-centric and not engaging, personal, or empathic. As a result, therapy compliance by patients is typically less than desirable.

SUMMARY OF THE INVENTION

There is, therefore, a need to improve automated therapy compliance programs in terms of providing a way to enhance patient understanding and improve patient compliance. An object of the disclosed technology is solved by the subject-matter of the appended independent claims, wherein further embodiments are incorporated in the dependent claims, in the accompanying drawings and the following description.

Disclosed herein are improved computing systems, methods, and computer readable media to automatically generate video presentations that use an avatar to explain therapy compliance data presentations. In accordance with one or more embodiments, a computer-implemented method of generating a video presentation comprises determining a plurality of insights, each insight associated with a respective one of a plurality of data presentations and based on at least a portion of therapy compliance data for a patient, determining, for each of the plurality of insights, an insight location for the respective insight on a reporting dashboard, and an avatar position for an avatar on the reporting dashboard, formulating a feedback message for each of the plurality of insights, and generating a video presentation based on the reporting dashboard, the video presentation including a display of the plurality of data presentations and a display of an animation sequence for the avatar, the animation sequence including, for each of the plurality of insights, a display of the avatar at the respective avatar position, the avatar pointing to the insight location for the respective insight, and a synchronized audio signal representing the feedback message for the respective insight.

In accordance with one or more embodiments, a computer-implemented system comprises a processor, and a memory coupled to the processor, the memory comprising instructions which, when executed by the processor, cause the computing system to perform operations comprising determining a plurality of insights, each insight associated with a respective one of a plurality of data presentations and based on at least a portion of therapy compliance data for a patient, determining, for each of the plurality of insights, an insight location for the respective insight on a reporting dashboard, and an avatar position for an avatar on the reporting dashboard, formulating a feedback message for each of the plurality of insights, and generating a video presentation based on the reporting dashboard, the video presentation including a display of the plurality of data presentations and a display of an animation sequence for the avatar, the animation sequence including, for each of the plurality of insights, a display of the avatar at the respective avatar position, the avatar pointing to the insight location for the respective insight, and a synchronized audio signal representing the feedback message for the respective insight.

In accordance with one or more embodiments, at least one non-transitory computer readable storage medium comprises instructions which, when executed by a computing system, cause the computing system to perform operations comprising determining a plurality of insights, each insight associated with a respective one of a plurality of data presentations and based on at least a portion of therapy compliance data for a patient, determining, for each of the plurality of insights, an insight location for the respective insight on a reporting dashboard, and an avatar position for an avatar on the reporting dashboard, formulating a feedback message for each of the plurality of insights, and generating a video presentation based on the reporting dashboard, the video presentation including a display of the plurality of data presentations and a display of an animation sequence for the avatar, the animation sequence including, for each of the plurality of insights, a display of the avatar at the respective avatar position, the avatar pointing to the insight location for the respective insight, and a synchronized audio signal representing the feedback message for the respective insight.

BRIEF DESCRIPTION OF THE DRAWINGS

The various advantages of the embodiments will become apparent to one skilled in the art by reading the following specification and appended claims, and by referencing the following drawings, in which:

FIGS. 5A-5C provide flow diagrams illustrating an example method of generating a video presentation according to one or more embodiments.

DESCRIPTION OF EMBODIMENTS

Disclosed herein are improved computing systems, methods, and computer readable media to automatically generate video presentations that use an avatar to explain therapy compliance data presentations. As described herein, the technology operates to automatically generate a therapy compliance video by determining a plurality of insights relating to compliance data presentations, determining a location for each insight and an avatar position on a reporting dashboard, formulating feedback messages for the insights, and generating a video presentation an animation sequence, the animation sequence including, for each insight, a display of the avatar pointing to the insight location and a synchronized audio signal representing the feedback message for the insight. The disclosed technology helps improve the overall performance of automated therapy systems by providing a therapy compliance video containing key insights to explain the therapy compliance data presentations in a way to help the patient better absorb the compliance information. The disclosed therapy compliance video includes an avatar pointing to relevant compliance data presentations and a synchronized audio presentation providing feedback messages based on the compliance data presentations. The technology thus enables patients to form an improved understanding of the compliance information which, in turn, will lead to increased compliance with therapy requirements by patients. In embodiments, the patient or user engages in a dialog or conversation with the avatar.

Figure 1:
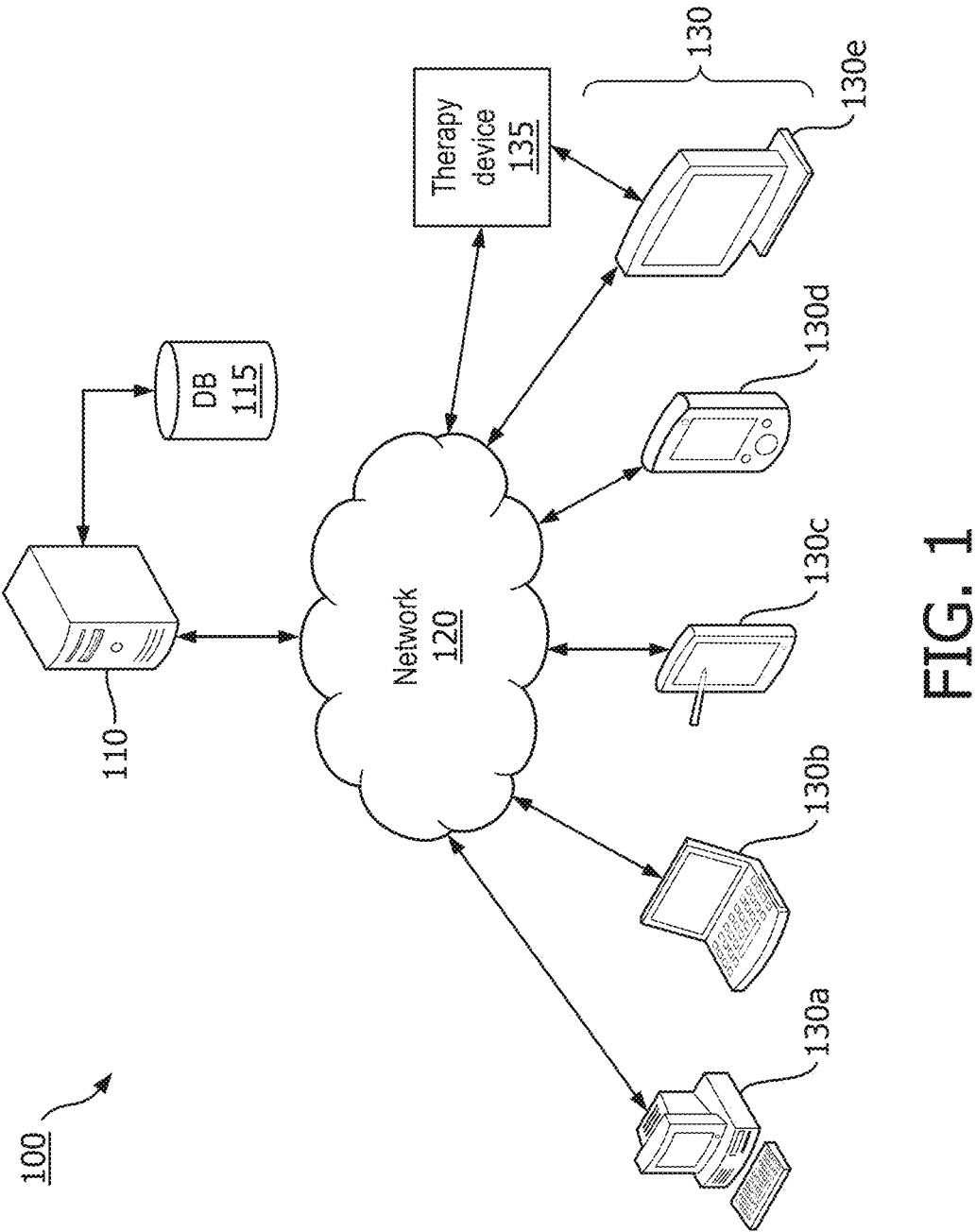
FIG. 1 is a block diagram illustrating an overview of an example of a networked computing environment for automatically generating a video presentation according to one or more embodiments.

FIG. 1 provides a block diagram illustrating an overview of an example of a networked computing environment 100 for automatically generating a video presentation according to one or more embodiments, with reference to components and features described herein including but not limited to the figures and associated description. As shown in FIG. 1, the networked computing environment 100 includes a server 110, a network 120, a plurality of user or client devices 130 (such as example client devices 130a-130e). The network 120 can include, e.g., a public (or public facing) network, such as the Internet, and can include any network available to patients.

The server 110 is a computing device that operates to provide communication and facilitate interaction between users (such as via client devices 130a-130e) and services hosted within a networked infrastructure (e.g., services hosted by the server 110 or by other servers, not shown in FIG. 1, connected to the server 110). For example, the server 110 can operate as an edge server or a web server. In embodiments, the server 110 is representative of a set of servers that can range in the tens, hundreds or thousands of servers. The networked services include services and applications (such as automated therapy programs) provided to users (such as therapy patients). As used herein, a user can be, e.g., a therapy patient or someone assisting the therapy patient. In embodiments, the server is connected to a database 115 (which can include one or more physical or virtual databases, including distributed databases). The database 115 stores data relating to automated therapy programs, including therapy compliance data. In embodiments, the server 110 includes (or incorporates) a plurality of physical or virtual servers or machines. In embodiments, the server 110 includes a docker container (e.g., in a cloud environment).

The client devices 130 (such as example client devices 110a-110e) are devices that communicate over a computer network (e.g., the network 120, such as the Internet) and can include devices such as a desktop computer 130a, a laptop computer 130b, a tablet 130c, a mobile phone 130d (e.g., smart phone), and/or a display 130e (e.g., smart TV), etc. The client devices 130a-130e can operate in a networked environment and run application software, such as a web browser or an application to execute a therapy program, to facilitate networked communications and interaction with other remote computing systems, including one or more servers (such as, e.g., the server 110), using connections (e.g., logical connections) via the network 120.

In embodiments, therapy patients may use a therapy device such as, e.g., therapy device 135. The therapy device 135 can be configured to provide automated therapy (such as, e.g., via an connected CPAP device). The therapy device communicates over the network 120 with the server 110 to, for example, receive therapy data and commands and to provide therapy data such as data relating to therapy compliance by the patient. In embodiments, the therapy device 135 includes or is in communication with a display (such as, e.g., the display 130e). In embodiments, the therapy device 135 displays information relating to an automated therapy program, including information relating to therapy compliance (e.g., therapy compliance data).

Therapy compliance data is provided to a patient or user via a reporting dashboard presented (e.g., displayed) on a user or client device such as, e.g., one or more of client devices 130a-130e, and/or on the therapy device 135. The therapy compliance data can include, for example, data covering a specific period such as, e.g., weekly, monthly, a plurality of weeks (e.g., four weeks), etc. The therapy compliance data can include data regarding patient use of or interaction with the therapy device 135. Therapy compliance data as displayed to a user or patient includes, e.g., data presentations. A data presentation includes one or more of a graph, a chart, a diagram, etc. to provide visualization of one or more aspects of the data.

In accordance with one or more embodiments (as described further herein), a video presentation is automatically generated to provide therapy compliance data to a patient or user. The video presentation includes a display of therapy compliance data presentations and a display of an animation sequence, the animation sequence including, for each insight, a display of the avatar at the avatar position, the avatar pointing to the insight location for the insight, and a synchronized audio signal representing the feedback message for the insight. In embodiments, a video presentation is generated on a periodic basis to provide therapy compliance data updated to cover a particular period such as, e.g., weekly, monthly, etc. Thus, in accordance with embodiments, important insights on therapy compliance and patient behavior generated from the connected device data of the patient, are being delivered to the user by a narrative from the avatar. While explaining these insights, the avatar is rendered to be next to or in front of the information and points at the corresponding data presentation (e.g., graph/ chart/diagram) or detail of the data presentation. In embodiments, the avatar is positioned to avoid blocking the view of the particular insight being explained.

The video presentation can be generated according to the teachings of this disclosure and delivered and/or presented to the user in one or more ways. In some embodiments, the video presentation is generated by the server 110 and sent as web or video data to the therapy patient or user—e.g., delivered to a client device 130 or the therapy device 135 (e.g., to an application or app on the client device 130 or therapy device 135) via the network 120. In some embodiments, the video data can be, for example, a video file (e.g., MP4 file) to be downloaded, stored and played on the client device 130 or the therapy device 135. As another example, the video data can be a streaming video file to be streamed to and played in real time by a client device 130 or the therapy device 135. In some embodiments, the web data can include a sequence of pages (e.g., html pages) with an overlay of an avatar or avatar animation. For example, the avatar or avatar animation can be streamed to the user's client device. In some embodiments, data and/or commands are sent to the client device and the video presentation (or a portion thereof) is generated dynamically at the client device based on such data/commands.

In some embodiments, therapy compliance data is sent by the server 110 to the therapy patient or user—e.g., delivered to a client device 130 or the therapy device 135 via the network 120. In such embodiments, the client device 130 or the therapy device 135 generates the video presentation based on the therapy compliance data—using, for example, an application for generating the video presentation according to the teachings of this disclosure. The video presentation as generated can then be stored locally at the client device 130 or therapy device 135, and/or displayed to the patient or user by the client device 130 or therapy device 135. In embodiments, an application on a client device for generating a video presentation and/or viewing a generated video presentation is downloaded from the server 110.

Some or all components in the networked computing environment 100 can be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components of the networked computing environment 100 and/or functions performed by such components can be implemented in one or more modules as a set of program or logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured ASICs, combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations by one or more components of the networked computing environment 100 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 2:
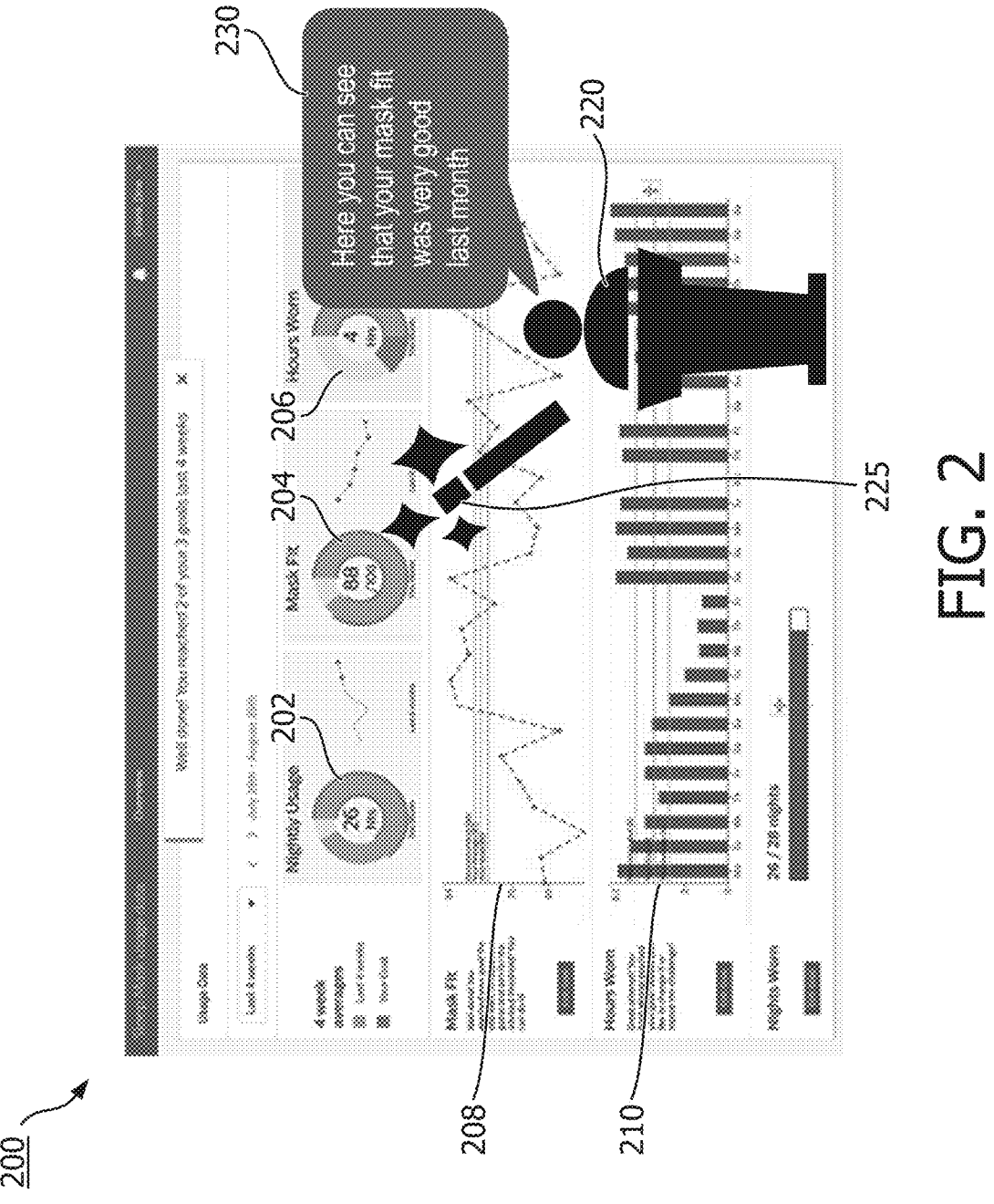
FIG. 2 is a diagram illustrating an example of a reporting dashboard according to one or more embodiments.

Turning now to FIG. 2, a diagram is provided illustrating an example of a reporting dashboard 200 used in generating a video presentation according to one or more embodiments, with reference to components and features described herein including but not limited to the figures and associated description. The reporting dashboard 200 provides an example of a web or video screen having several components arranged thereon, including a plurality of example data presentations such as charts 202, 204, and 206, and graphs 208 and 210. In the example of FIG. 2, the subject matter of the data presentations all relate to CPAP therapy compliance data, where CPAP therapy is illustrated as an example therapy; compliance data for other therapies can also be presented in data presentations via a similar type of reporting dashboard.

The reporting dashboard 200 further includes an example of an avatar 220. The example avatar 220 is illustrated as a figure (e.g., an icon of a person) overlaying portions of the graph 208 and the graph 210 on the reporting dashboard 200. In embodiments, the avatar can be of a variety of appearances, including a head display, a head and body display (full or partial body), etc., and can include a face depiction (including facial expressions). Examples of avatars include digital avatars provided by Soul Machines, www.soulmachines.com. In embodiments, the avatar can have a facial appearance based on or appearing like the face of a specific person. For example, in embodiments the avatar can have a facial appearance of a person with characteristics similar to those of the patient. As another example, the avatar can have an appearance of a person with certain characteristics such as, e.g., gender, age, etc. In embodiments, the characteristics of appearance (e.g., gender and/or age) can match or be similar to those of the patient. As another example, in embodiments the avatar can have the appearance of or otherwise mimic a therapist (such as, e.g., a therapist familiar to the patient). In some embodiments, the avatar can show behavior based on the patient's personality characteristics such as, e.g., characteristics provided by a personality profile stored in the patient's medical records or in a database of patient information. For example, a more directive or a less directive avatar style can be used based on the personality characteristics of the patient.

As shown in the example of FIG. 2, the avatar 220 is illustrated with a pointer 225 pointing to a part of the chart 204 on the dashboard 200. Thus, in embodiments, the avatar 220 is rendered with a pointer 225 to point to places on the dashboard 200. In some embodiments, the avatar 220 is rendered using an arm, hand or finger to point to places on the dashboard 200. In some embodiments, an intensity of the pointing activity (e.g., movement of the pointer or arm/finger/hand in the vicinity of the insight) is based on a weight of the insight; thus higher-weighted insights may result in higher intensity pointing. The avatar 220 is further illustrated, via a speech balloon, as presenting speech representing an example feedback message 230. The example feedback message 230 ("Here you can see that your mask fit was very good last month") relates to the subject matter of the example chart 204 (mask fit) that the avatar is also pointing to. The example feedback message 230 is a positive feedback message, intended to help the user understand the compliance data (good mask fit) and provide positive feedback as encouragement for the patient to continue therapy compliance. Other types of feedback messages are possible, including those with a more neutral of negative tone, to help explain therapy compliance data. In embodiments, the level of information density/complexity of feedback messages can be matched to the user's characteristics, such as, e.g., the knowledge level or experience of the user.

In embodiments, the feedback message 230 is presented to the user via an audio signal (e.g., speech) including words of the feedback message—e.g., as played via a speaker or an audio port in the client device 130 or the therapy device 135. The language is selected to be a language understood by the user (e.g., the user's primary spoken language). The audio signal can be generated, e.g., via a text-to-speech function that provides a realistic-sounding voice. In some embodiments, a text block (e.g., appearing as a speech balloon, or subtitles, or other block or grouping of text) with the feedback message (or a portion thereof) is also displayed while the audio signal is presented to the user. In some embodiments, such a text block is displayed with the feedback message without the audio signal. In some embodiments, no speech balloon is displayed. In embodiments, the audio signal for the feedback message provides a voice based on gender (e.g., a man's voice or a woman's voice), age, etc. and can be based on or sound like the voice of a specific person. In embodiments, the audio signal for the feedback message provides a tone of voice based on one or more of a weight of the associated insight, whether the feedback message is positive, neutral or negative, whether the feedback message is related to a feedback message previously presented (e.g., a reminder of a previous message). In embodiments, the audio signal for the feedback message 230 is integrated with the avatar 220.

In embodiments, characteristics of the avatar 220 and/or the audio signal for the feedback message 230 are selectable, e.g., via a user interface. While the example of FIG. 2 illustrates an example arrangement of components (e.g., number and location of data presentations, avatar location, pointer, and feedback message), other arrangements are possible.

Figure 3:
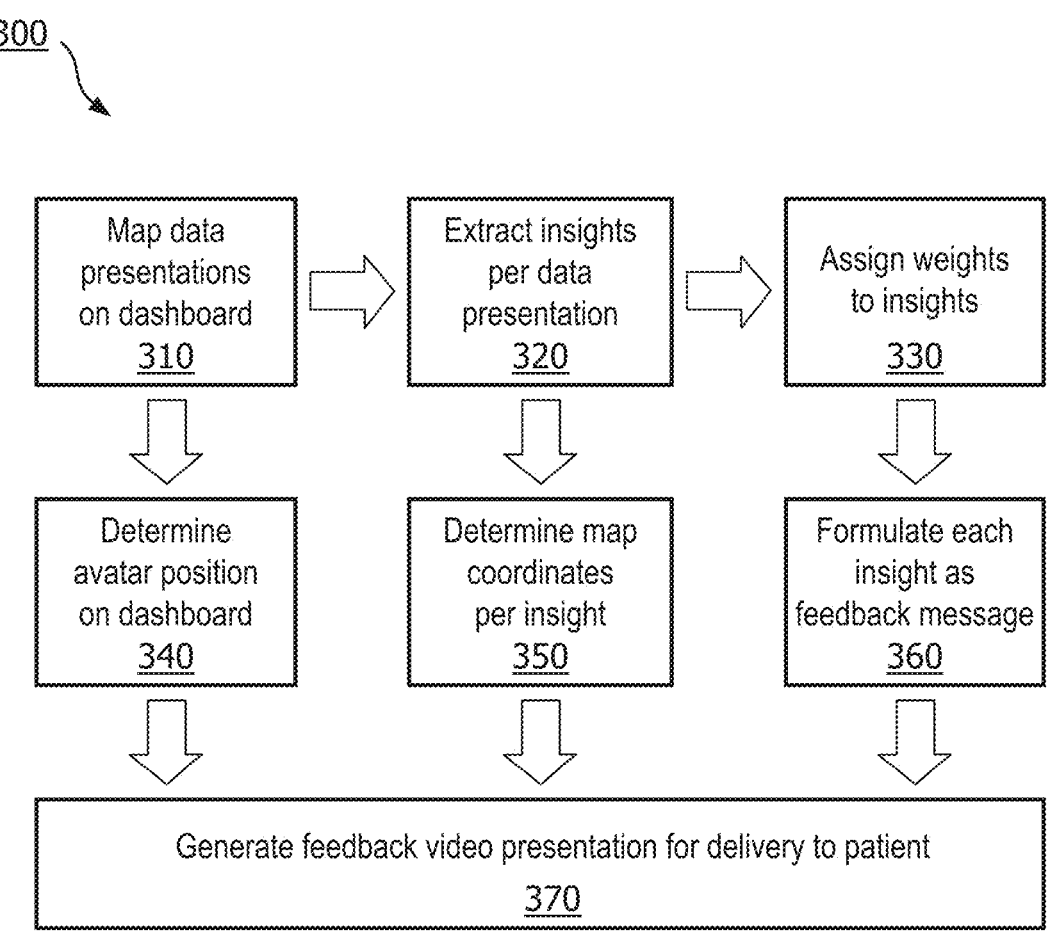
FIG. 3 is a diagram illustrating an example process for generating a video presentation according to one or more embodiments.

FIG. 3 provides a diagram illustrating an example process 300 (e.g., one or more algorithms) for generating a video presentation according to one or more embodiments, with reference to components and features described herein including but not limited to the figures and associated description. Illustrated processing block 310 provides for mapping data presentations relating to therapy compliance data to locations on a reporting dashboard. As explained herein, a data presentation includes one or more of a graph, a chart, a diagram, etc. to provide visualization of one or more aspects of the data. For example, a data presentation such as a graph can provide a visual representation of compliance data, e.g., information or status, etc., and can include presentation of such data over a time period (e.g., days, weeks, a month, etc.).

The location for each data presentation should be set to provide for a clear view of the data presentation and, thus, enable the avatar to point (e.g., via a pointer) to a defined location when a synchronized audio signal is presented to explain the therapy compliance data represented in the particular data presentation. In embodiments, the location for each data presentation is based on a design of a user interface for or integrated with the reporting dashboard (e.g., a design for a web page). In embodiments, the location for data presentations is based on features such as, e.g., the number of data presentations to be provided on the reporting dashboard, the type of each data presentation, the subject matter of each data presentation, etc. For example, in some embodiments data presentations covering similar subject matter are grouped together or in proximity to each other on the reporting dashboard. In some embodiments, the reporting dashboard is similar as to elements in design for the example reporting dashboard 200 (FIG. 2, already discussed). In some embodiments, once the location for each data presentation is determined on the reporting dashboard, the location is fixed for the video presentation to be generated. In some embodiments, the appearance and/or locations for one or more of the data presentations are modified (e.g., dynamically) during the video presentation. For example, the size and/or appearance of a data presentation can change depending on whether an insight for that particular data presentation is being explained at the time. As one example, when the avatar points to a particular insight associated with a data presentation, the data presentation (or portion thereof) can be zoomed in and/or a color applied to the data presentation (or portion thereof) to make it stand out. As another example, a data presentation can be enlarged and/or highlighted when it is being explained or referred to, and the data presentation can also be faded out after the explanation is complete or when another data presentation is to be referred to.

Illustrated processing block 320 provides for extracting one or more insights for each data presentation on the dashboard. An insight represents a piece of information reflecting a key idea (e.g., an important conclusion) for the data in the data presentation. As one example, for the reporting dashboard 200 (FIG. 2), an insight for the example chart 204 could include the idea that the data reflects a good mask fitting for most of the previous month. In some examples, a data presentation can have more than one insight. Accordingly, each insight is associated with a data presentation. In examples where there is more than one insight for a particular data presentation, each of those insights is associated with that particular data presentation. In some examples, an insight can be relevant to (and, thus, associated with) more than one data presentation.

In embodiments, the insight for a particular data presentation can be based on the type of data presentation, the subject matter of the data in the data presentation, whether the data presentation reflects a positive development (e.g., an advance or improvement), a neutral development (e.g., little to no change), or a negative development (e.g., a setback or decrease) in the patient's therapy compliance, and/or other factors. In some embodiments, the insight for a particular data presentation can be based on a predefined statement (e.g., a predefined contextual insight).

In some embodiments, a data presentation type can have a set of predefined statements providing a range of potential insights to be selected based on the actual therapy compliance data. In some embodiments, selection of an insight from a set of predefined statements includes the following aspects: (a) retrieving a plurality of predetermined statements based on the type of the data presentation, (b) determining, for each of the plurality of predetermined statements, a confidence score representing a probability that the respective statement is true based on the actual therapy compliance data, and (c) selecting the respective statement having the highest confidence score. In some embodiments, an insight is modified to reflect additional data or cues from the therapy compliance data (e.g., a specific day or date, month, etc.). In some embodiments, the additional data or cues are alternatively (or additionally) included in the feedback message formulated from the insight.

Illustrated processing block 330 provides for assigning a weight (e.g., a rank) to each of the insights. Weighting (e.g., ranking) is used in embodiments to select an order of presentation for each insight in the video presentation to be generated for the user. In embodiments, weights for an insight are based on one or more factors, including, e.g., a condition level of the patient, a type or level of change in the patient's therapy compliance data, a relevance of the insight to the behavior or overall therapy compliance data for the patient, whether the insight reflects a positive, neutral or negative report, and/or the confidence score for the insight statement. In some embodiments, weighting is modified based on factors relating to other insights to be included. Such factors can include ordering presentation of insights to enhance receipt, understanding and/or encouragement for the patient. For example, such factors can provide for alternating positive and negative insights in the video presentation to be generated if such alternating is determined to enhance receipt or understanding by the user. In some embodiments, insights are labeled as <strength> or <weakness> (or, additionally or alternatively, labeled as <positive> or <negative>) to indicate a positive or negative aspect of the corresponding message, and these labels can be used to balance feedback messages (e.g., in an alternating fashion).

Illustrated processing block 340 provides for determining the position or location of the avatar on the reporting dashboard. The avatar position is typically determined to enhance visibility of the data presentation that is the subject of the insight being presented, and further to enhance the ability to have the avatar point to a relevant location on the data presentation while the insight is being explained. For example, the avatar is typically positioned such that, when pointing to the data presentation, the relevant portion of the data presentation being discussed remains clear and unobstructed to the viewing user. In embodiments, the avatar position can change for each insight being presented. In embodiments, the respective avatar position is determined based on one or more of the size of the avatar, the type of the data presentation, the location of the insight, the amount of free space in the reporting dashboard, and/or the location of free space in the reporting dashboard. For example, the avatar can be positioned proximate to (e.g., adjacent to or next to) the particular data presentation being explained at the time.

Illustrated processing block 350 provides for mapping coordinates for each insight to locations on the reporting dashboard. For each insight, the coordinates will typically be mapped to a location on the reporting dashboard corresponding to a place on the respective data presentation associated with the insight. The insight location is used as a location for the avatar to point to (using, e.g., a pointer or an arm, hand, or finger) when the insight is explained. As one example, for the dashboard illustrated in FIG. 2, there is an insight associated with the chart 204, and the insight location is the location on the dashboard 200 that the avatar 220 is pointing to via the pointer 225. In embodiments, only those insights to be presented to the user are mapped to the dashboard (e.g., in cases where a subset of insights are selected).

Illustrated processing block 360 provides for formulating insights as feedback messages. An insight is formulated into a feedback message to effectively turn the insight into a natural-sounding audio message (e.g., as if spoken by a person). In embodiments, a feedback message is formulated for each insight associated with a data presentation appearing on the dashboard. In embodiments, a feedback message is formulated for a subset of all insights associated with a data presentation appearing on the dashboard. For example, in some embodiments a feedback message is formulated for the subset of top-weighted (e.g., top-ranked) insights. In embodiments, the subset of insights includes all insights having a weight above a particular threshold. In some embodiments, insights having a high interest to the user are selected for the subset to be presented. For example, users might be interested in specific information such as the progress towards their goals. Thus, for example, a user can set a target/report motivation at the beginning of each period, and the insights for the video presentation are selected to include, e.g., a summary of usage data presentations tailored to the user's interest and/or goals. In some embodiments, a user can provide a query to show their interests/focus—for example, the user can ask that the avatar summarise the usage data in terms of "the progress of total usage in past two weeks." Then the video presentation is generated "on the fly" to select those insights according to the user's query, and the avatar reports those insights in the generated video presentation.

In embodiments, the feedback message is based on the predetermined message for the insight having the highest confidence score. In embodiments, the feedback message is based on applying natural language modeling to the insight (e.g., via a natural language modeling application). Examples of natural language modeling techniques include the following: (a) conditioned text generation technology that generates different text based on the given input, e.g., given the inputs (insights), the technology generates different texts (feedback messages); (b) conditional transformer language modeling trained to condition on control codes that govern style, content, and task-specific behavior; and (c) text-to-speech technology that translates text into realistic and expressive speech, i.e., emotional speech. Examples of natural language modeling applications include, e.g., applications available in the Google Cloud AutoML and Natural Language API" which is which is applied in Google DialogFlow, and Amazon Lex. In some embodiments, the feedback message is based both on the predetermined message for the insight having the highest confidence score and on applying natural language modeling to the insight—for example, applying natural language modeling to the predetermined message having the highest confidence score. In some embodiments, the feedback message is adapted based on the patient's personality characteristics such as, e.g., characteristics provided by a personality profile stored in the patient's medical records or in a database of patient information.

In some embodiments, the duration of the feedback message is based on the weight of the corresponding insight, such as, e.g., higher-weighted insights will have a longer duration feedback message. In some embodiments, the duration of the feedback message is based on the weight of the corresponding insight and the distribution of weights among the various insights (e.g., proportional to the weighting across insights).

Illustrated processing block 370 provides for generating a video presentation for delivery to the user. The video presentation is the vehicle for presenting the therapy compliance feedback information to the user. The video presentation is based on the reporting dashboard as described herein, and includes a display of the data presentations along with a display of an avatar animation sequence. Each data presentation has an associated insight. The animation sequence includes, for each insight, a display of the avatar at the determined avatar position, where the avatar points to the insight location for the insight.

The animation sequence further includes, for each insight, a synchronized audio signal representing the feedback message for the respective insight (e.g., as if spoken by the avatar). The synchronized audio signal, when played (e.g., as part of playing the video presentation as a video file or playing the animation sequence while displaying the dashboard), provides an audio speech containing the feedback message for the insight. The audio signal is synchronized with the avatar such that, for each feedback message, the avatar points to the respective insight location while the audio signal provides the speech for the feedback message. In embodiments, the tone of voice in the synchronized audio signal for the feedback message is adapted based on one or more factors such as the weight of the associated insight, whether the feedback message is positive, neutral or negative, whether the feedback message is related to a feedback message previously presented (e.g., a reminder of a previous message), etc.

In embodiments where a speech balloon is displayed on the reporting dashboard, the text in the speech balloon corresponds to the feedback message while the avatar points to the respective insight location.

In some embodiments, the video presentation is generated as web or video data to be delivered to the user. In some embodiments, the video data can be, for example, a video file (e.g., MP4 file) to be downloaded, stored and played (e.g., on the client device 130 or the therapy device 135). As another example, the video data can be a streaming video file to be streamed to and played in real time by a client device 130 or therapy device 135. In some embodiments, the web data can include a sequence of pages (e.g., html pages) with an overlay of an avatar or avatar animation.

In some embodiments, the video presentation further includes an interactive dialog portion (e.g., the user engages in a conversation with the avatar). The video dialog portion includes providing a prompt to the user, and receiving a user response to the prompt. For example, the video dialog portion provides a prompt in the form of a query to the user, and then receives a response to the query from the user. The prompt can be in the form of an audio prompt (e.g., spoken question) or a text prompt (e.g., text box). The prompt attempts to seek information, e.g., contextual information, regarding the patients use of the therapy device, understanding of the video presentation, etc. For example, the prompt can ask the user (e.g., patient or patient's assistant) why the patient's usage during a particular period was below a certain level, or why the patient did not use the device during a period.

The response from the user can be in the form of an audio response (e.g., a spoken response using a microphone coupled to the client device 130 or the therapy device 135), a text response (e.g., entry of text in a text box), clicking a check box or radio button, facial expression (e.g., observation of the user's face via a webcam), etc. As one example, the user can be prompted for input regarding use (or non-use) of the therapy device. The user's response could include information regarding such use or non-use (e.g., patient could not use the therapy device due to travel, or due to physical conditions impeding use of the device, etc.). Thus, by allowing additional user input (structured input or in free-text or voice), the disclosed technology helps to fill gaps between data and interpretation—e.g., current usage data can tell the patient skipped a few nights but it does not tell "why"; the user's can provide missing information by adding notes or answering the prompt. As another example, the prompt can include a query for information about relevance of various insights to the user.

In embodiments, the user may provide an unprompted response to the video presentation. Responses in the form of a spoken response, text response, and/or facial expression are interpreted to determine the meaning of the user's response. In embodiments, information provided by a user response is provided to a therapist/practitioner and/or included (e.g., stored) in the patient's medical or therapy history (e.g., to provide context for therapy compliance data). Additionally, a user response can be used for personalization of future presentations/messages, thus providing, e.g., prioritization of certain types of insights in future reporting as a mode of supervised learning.

In some embodiments, the video presentation is modified based on the user response to the prompt. Modifications can include one or more of adjusting the avatar movements, providing additional information, re-ordering parts of the presentation, etc. As an example, a next feedback message is selected and presented to the user responsive to the user's input. As another example, the video presentation is modified to add additional information, such as guidance for using a device, other suggestions, etc. based on a user response. For example, the following example dialog illustrates how the presentation can be modified to present additional information:

Avatar: Your compliance has decreased, how come?

User: I was on holiday.

Avatar: I understand that it can be hard to take the device along. Here are some tips for using it on a holiday . . . (a) . . . (b) . . .

As another example, the presentation can include asking the user at the end if there are any questions or problems. In response, the user can, e.g., ask for more clarification about a graph or to repeat a certain graph, and the video presentation would adjust accordingly. In embodiments, if a user response provides something the system cannot handle such as, e.g., a faulty device or a sentence it does not understand, the user's response is sent to a customer service unit or a therapist, and a message is presented to the user that that somebody will contact the user soon.

In some embodiments, the reporting dashboard in the video presentation has interactive functionalities (e.g., presented as an interactive webpage with an avatar animation presented as an overlay). In this way, if the user (e.g., patient or assistant) wants to know more about certain insights, the user can explore it by clicking on specific parts that stand out (e.g., interactive components) and further details can be provided (including, e.g., that the avatar will provide further explanation). In some embodiments, the user can choose between a short factual explanation or a longer story including tips, tricks or anecdotes. As another example, if the user is more interested in a specific part (e.g., the user expresses interest via clicking on a portion multiple times), the video presentation can be tailored (e.g., for a next reporting cycle) to focus more on that part, including, optionally, a change in the layout of the reporting dashboard based on what is more interesting for the user.

The process 300 can generally be implemented in one or more components in the networked computing environment 100 (FIG. 1, already discussed). In embodiments, one or more features or functions of the process 300 can be implemented, at least in part, using machine learning techniques (such as, e.g., using a trained neural network). More particularly, the process 300 can be implemented as one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out the process 300 and/or functions associated therewith can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4A:
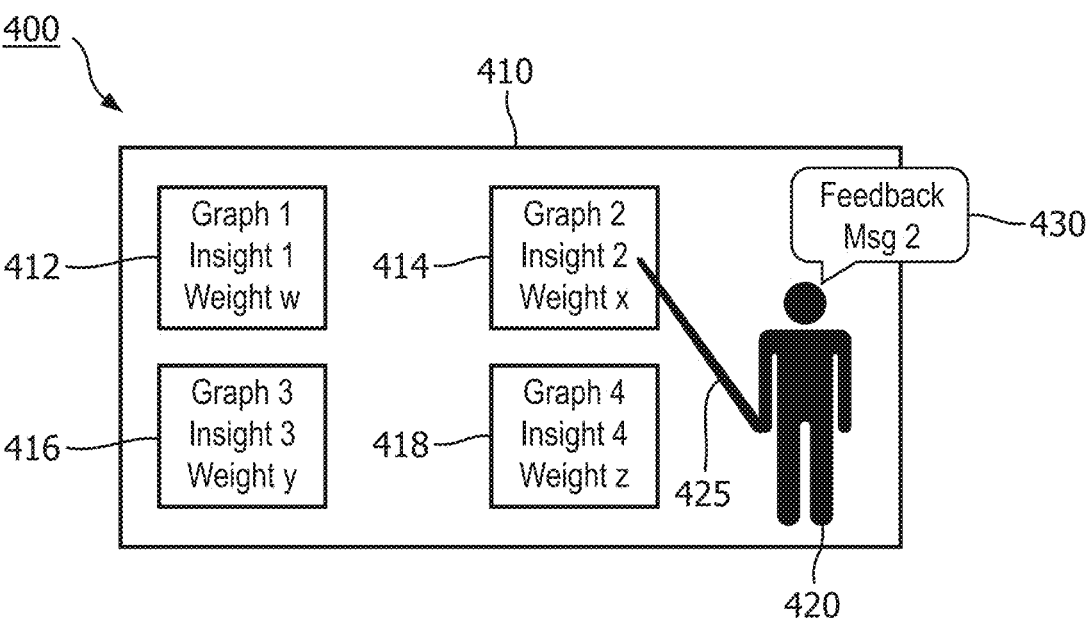
FIGS. 4A-4B provide diagrams illustrating an example of a reporting dashboard according to one or more embodiments.
Figure 4B:
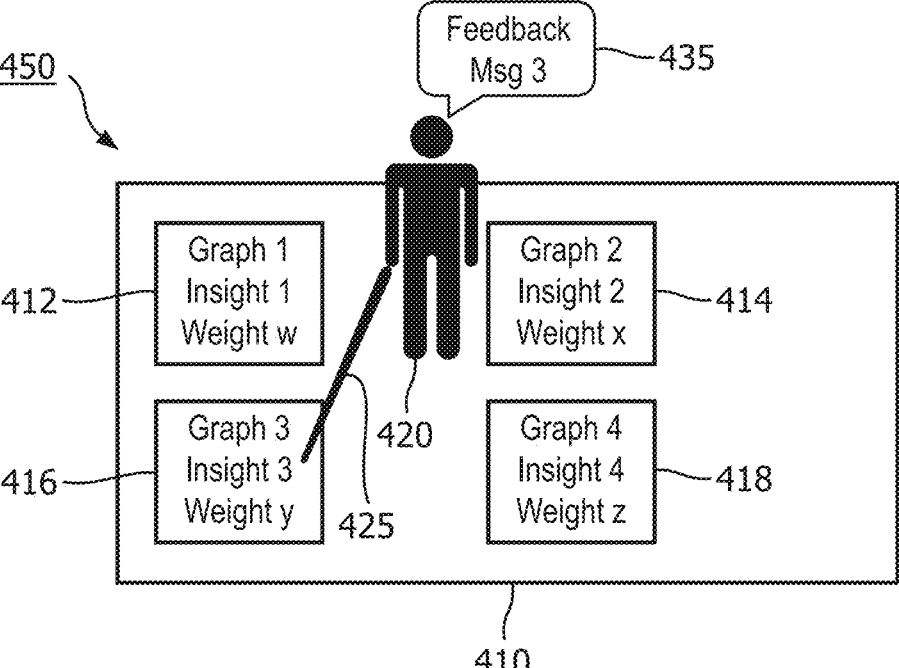

FIGS. 4A-4B provide diagrams 400 and 450 illustrating an example of a reporting dashboard 410 used in generating a video presentation according to one or more embodiments, with reference to components and features described herein including but not limited to the figures and associated description. In embodiments, the reporting dashboard 410 corresponds in overall design and function to the reporting dashboard 200 (FIG. 2, already discussed). The reporting dashboard 410 provides an example of a web or video screen having several components arranged thereon, including a plurality of example data presentations such as graphs 412, 414, 416 and 418, an avatar 420, a pointer 425, and feedback messages 430 or 435. As described herein, feedback messages are synchronized audio signals representing the feedback messages in spoken form, and can be accompanied by (or substituted with) a text presentation. Each graph in the reporting dashboard 410 has an associated insight, where the insight has a weight. Thus for example, graph 412 (Graph 1) has an associated insight 1 with weight w; graph 414 (Graph 2) has an associated insight 2 with weight x; graph 416 (Graph 3) has an associated insight 3 with weight y; and graph 418 (Graph 4) has an associated insight 4 with weight z. For generating a video presentation based on the reporting dashboard 410, the order of presenting insights 1-4 is based on the relative weights for each. In the example presented in FIGS. 4A-4B, the weights w, x, y and z have been determined such that weight x is the highest weight, weighty is the second highest weight, weight w is the next highest weight, and weight z is the lowest weight. Thus, in this example the insights are ranked, in order (high to low): insight 2, insight 3, insight 1, insight 4.

Turning now to FIG. 4A, the diagram 400 illustrates the avatar 420 at a first position on the reporting dashboard 410, adjacent to the graph 414. The avatar 420 is illustrated using the pointer 425 to point to the location of the highest ranked insight (insight 2). The speech balloon illustrates that the feedback message 430 (Feedback Msg 2, formed based on insight 2) is being presented at approximately the same time that the avatar 420 is pointing to insight 2. In embodiments, the avatar is positioned to avoid blocking the view of the particular insight (insight 2) being explained.

Turning now to FIG. 4B, the diagram 400 illustrates the avatar 420 is moved and now at a second position on the reporting dashboard 410, adjacent to the graphs 412 and 416. The avatar 420 is illustrated using the pointer 425 to point to the location of the second-highest ranked insight (insight 3). The speech balloon illustrates that the feedback message 435 (Feedback Msg 3, formed based on insight 3) is being presented at approximately the same time that the avatar 420 is pointing to insight 3. In embodiments, the avatar is positioned to avoid blocking the view of the particular insight (insight 3) being explained.

In some embodiments, a given data presentation has a plurality of insights associated with it, such as, e.g., insights associated with multiple trends in a graph. For example, referring to FIG. 4A, Graph 1 (graph 412) can have insights 1a and 1b which have weights 1a and 1b, respectively, and a feedback message for that insight. In some embodiments, if two insights are related they can be effectively combined for presenting one feedback message (e.g., "You were decreasing compliance this month, but the last week you are doing much better").

Figure 5B:
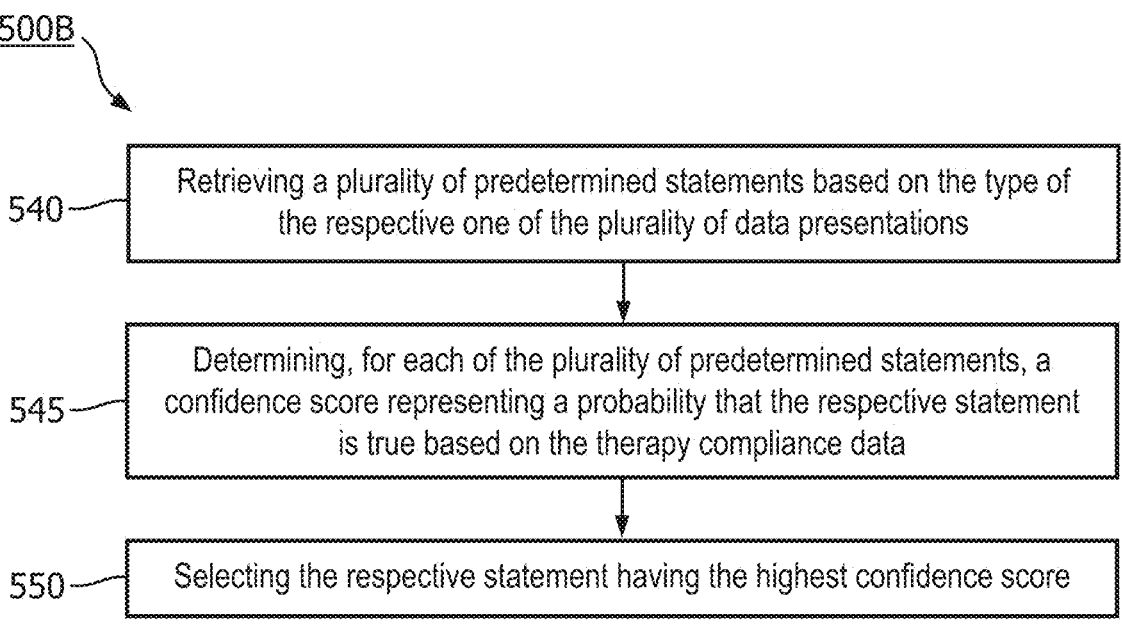
Figure 5C:
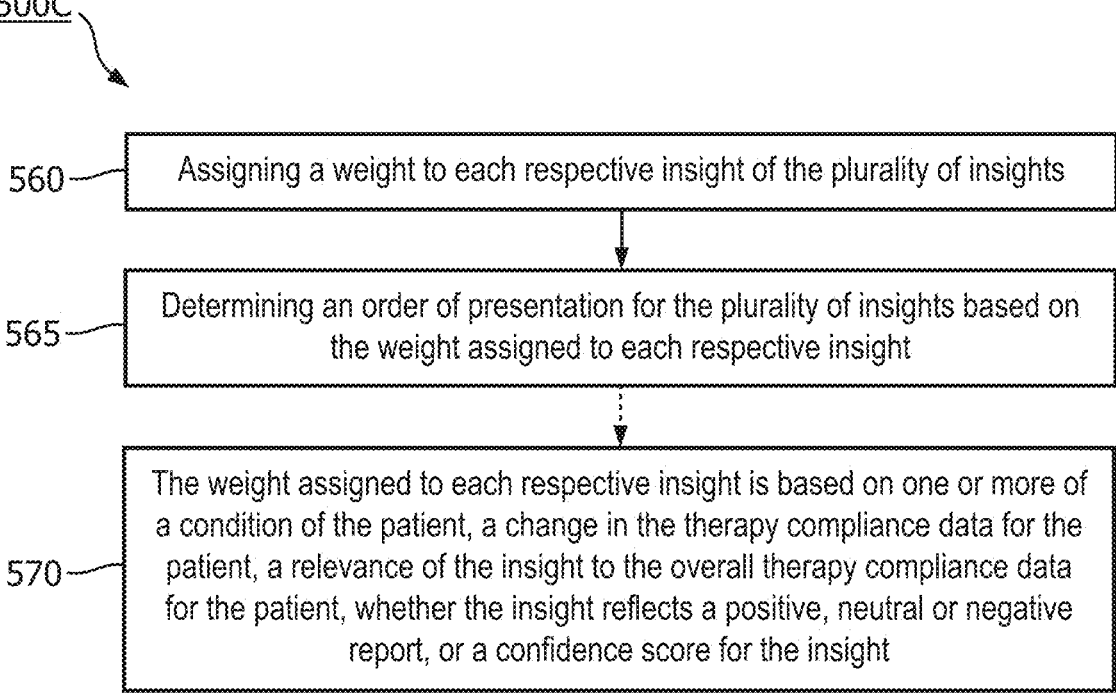
Figure 6:
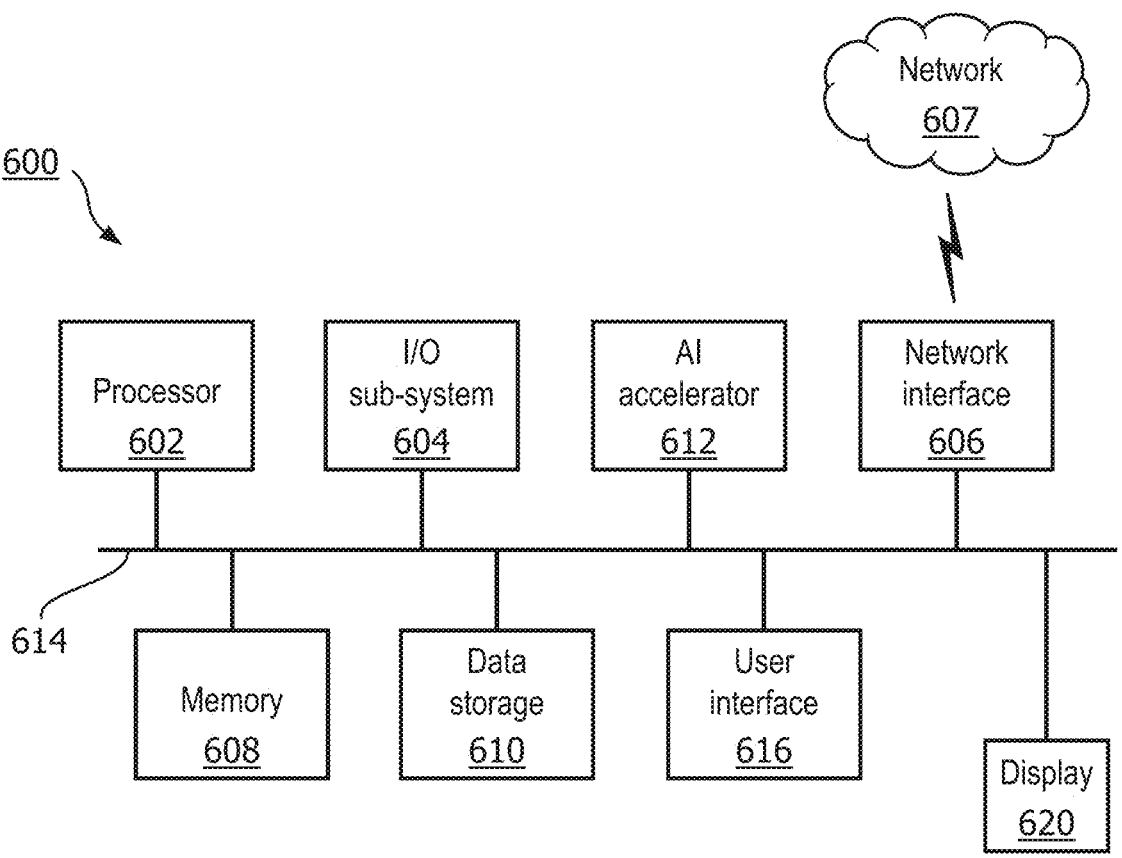
FIG. 6 is a diagram illustrating an example of a computing system for use in an automated video generation system according to one or more embodiments.

FIGS. 5A-5C provide flow diagrams illustrating an example method 500 (components 500A, 500B and 500C) of generating a video presentation according to one or more embodiments, with reference to components and features described herein including but not limited to the figures and associated description. The method 500 and its components 500A, 500B and 500C can generally be implemented in one or more components of the networked computing environment 100 (FIG. 1, already discussed) and/or the system 600 (FIG. 6, discussed further herein). More particularly, the method 500 and its components 500A, 500B and 500C can be implemented in one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations shown in the method 500 and its components 500A, 500B and 500C and/or functions associated therewith can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). As one example, the computer program code can include JavaScript/TypeScript.

Turning to FIG. 5A, the method 500A begins at illustrated processing block 505 which provides for determining a plurality of insights, where at block 505a each of the plurality of insights is associated with a respective one of a plurality of data presentations and based on at least a portion of therapy compliance data for a patient. Illustrated processing block 510 provides for determining, for each of the plurality of insights, an insight location for the respective insight on a reporting dashboard, and an avatar position for an avatar on the reporting dashboard. In embodiments, the avatar position is determined based on one or more of an avatar size, a type of the respective one of the plurality of data presentations, the insight location for the respective insight, an amount of free space in the reporting dashboard, or a location of free space in the reporting dashboard. Thus, in some embodiments or examples the avatar position can change for various insights, and in some embodiments or examples the avatar position can be the same for all insights.

Illustrated processing block 515 provides for formulating a feedback message for each of the plurality of insights. In some embodiments, each respective feedback message is formulated based on one or more of a predetermined feedback message or natural language modeling applied to the insight.

Illustrated processing block 520 provides for generating a video presentation based on the reporting dashboard, where at block 520a the video presentation includes a display of the plurality of data presentations and a display of an animation sequence for the avatar. At block 520b the animation sequence includes, for each of the plurality of insights, a display of the avatar at the respective avatar position, the avatar pointing to the insight location for the respective insight, and at block 520c the animation sequence further includes, for each of the plurality of insights, a synchronized audio signal representing the feedback message for the respective insight. In some embodiments, the video presentation further includes an interactive dialog portion, including providing a prompt to the user and receiving a user response to the prompt. In some embodiments, the video presentation is modified based on the user response to the prompt.

Turning now to FIG. 5B, illustrated processing block 540 of the method 500B provides for retrieving a plurality of predetermined statements based on a type of the respective one of the plurality of data presentations. Illustrated processing block 545 provides for determining, for each of the plurality of predetermined statements, a confidence score representing a probability that the respective statement is true based on the therapy compliance data. Illustrated processing block 550 provides for selecting the respective statement having the highest confidence score. Method 500B (blocks 540, 545 and 550) can generally be substituted for at least a portion of illustrated processing block 505 (FIG. 5A, already discussed).

Turning now to FIG. 5C, illustrated processing block 560 of the method 500C provides, in some embodiments, for assigning a weight to each respective insight of the plurality of insights. Illustrated processing block 565 provides, in some embodiments, for determining an order of presentation in the animation sequence for the plurality of insights based on the weight assigned to each respective insight. Illustrated processing block 570 provides, in some embodiments, that the weight assigned to each respective insight of the plurality of insights is based on one or more of a condition of the patient, a change in the therapy compliance data for the patient, a relevance of the insight to the behavior or overall therapy compliance data for the patient, whether the insight reflects a positive, neutral or negative report, or a confidence score for the insight.

FIG. 6 is a diagram illustrating a computing system 600 for use in an automated video generation system according to one or more embodiments, with reference to components and features described herein including but not limited to the figures and associated description. For example, the computing system 600 can be used within the networked computing environment 100 for automatically generating video presentations. Although FIG. 6 illustrates certain components, the computing system 600 can include additional or multiple components connected in various ways. It is understood that not all examples will necessarily include every component shown in FIG. 6. As illustrated in FIG. 6, the computing system 600 includes one or more processors 602, an I/O subsystem 604, a network interface 606, a memory 608, a data storage 610, an artificial intelligence (AI) accelerator 612, a user interface 616, and/or a display 620. These components are coupled, connected or otherwise in data communication via an interconnect 614. In some embodiments, the computing system 600 interfaces with a separate display. The computing system 600 can implement one or more components or features of the devices in the networked computing environment 100 and/or any of the components or methods described herein with reference to FIGS. 1-3, 4A-4B, and/or 5A-5B.

The processor 602 includes one or more processing devices such as a microprocessor, a central processing unit (CPU), a fixed application-specific integrated circuit (ASIC) processor, a reduced instruction set computing (RISC) processor, a complex instruction set computing (CISC) processor, a field-programmable gate array (FPGA), a digital signal processor (DSP), etc., along with associated circuitry, logic, and/or interfaces. The processor 602 can include, or be connected to, a memory (such as, e.g., the memory 608) storing executable instructions and/or data, as necessary or appropriate. The processor 602 can execute such instructions to implement, control, operate or interface with any one or more components or features of the devices in the networked computing environment 100 and/or any of the components or methods described herein with reference to FIGS. 1-3, 4A-4B, and/or 5A-5B. The processor 602 can communicate, send, or receive messages, requests, notifications, data, etc. to/from other devices. The processor 602 can be embodied as any type of processor capable of performing the functions described herein. For example, the processor 602 can be embodied as a single or multi-core processor(s), a digital signal processor, a microcontroller, or other processor or processing/controlling circuit. The processor can include embedded instructions (e.g., processor code).

The I/O subsystem 604 includes circuitry and/or components suitable to facilitate input/output operations with the processor 602, the memory 608, and other components of the computing system 600.

The network interface 606 includes suitable logic, circuitry, and/or interfaces that transmits and receives data over one or more communication networks using one or more communication network protocols. The network interface 606 can operate under the control of the processor 602, and can transmit/receive various requests and messages to/from one or more other devices. The network interface 606 can include wired or wireless data communication capability; these capabilities can support data communication with a wired or wireless communication network, such as the network 607, the network 120 (FIG. 1, already discussed), and further including the Internet, a wide area network (WAN), a local area network (LAN), a wireless personal area network, a wide body area network, a cellular network, a telephone network, any other wired or wireless network for transmitting and receiving a data signal, or any combination thereof (including, e.g., a Wi-Fi network or corporate LAN).

The network interface 606 can support communication via a short-range wireless communication field, such as Bluetooth, NFC, or RFID. Examples of network interface 606 include, but are not limited to, one or more of an antenna, a radio frequency transceiver, a wireless transceiver, a Bluetooth transceiver, an ethernet port, a universal serial bus (USB) port, or any other device configured to transmit and receive data.

The memory 608 includes suitable logic, circuitry, and/or interfaces to store executable instructions and/or data, as necessary or appropriate, when executed, to implement, control, operate or interface with any components or features of the devices in the networked computing environment 100 and/or any of the components or methods described herein with reference to FIGS. 1-3, 4A-4B, and/or 5A-5B. The memory 608 can be embodied as any type of volatile or non-volatile memory or data storage capable of performing the functions described herein, and can include a random-access memory (RAM), a read-only memory (ROM), write-once read-multiple memory (e.g., EEPROM), a removable storage drive, a hard disk drive (HDD), a flash memory, a solid-state memory, and the like, and including any combination thereof. In operation, the memory 608 can store various data and software used during operation of the computing system 600 such as operating systems, applications, programs, libraries, and drivers. Thus, the memory 608 can include at least one non-transitory computer readable medium comprising instructions which, when executed by the computing system 600, cause the computing system 600 to perform operations to carry out one or more functions or features of the one or more components or features of the devices in the networked computing environment 100 and/or any of the components or methods described herein with reference to FIGS. 1-3, 4A-4B, and/or 5A-5B. The memory 608 can be communicatively coupled to the processor 602 directly or via the I/O subsystem 604.

The data storage 610 can include any type of device or devices configured for short-term or long-term storage of data such as, for example, memory devices and circuits, memory cards, hard disk drives, solid-state drives, non-volatile flash memory, or other data storage devices. The data storage 610 can include or be configured as a database, such as a relational or non-relational database, or a combination of more than one database. In some examples, a database or other data storage can be physically separate and/or remote from the computing system 600, and/or can be located in another computing device, a database server, on a cloud-based platform, or in any storage device that is in data communication with the computing system 600.

The artificial intelligence (AI) accelerator 612 includes suitable logic, circuitry, and/or interfaces to accelerate artificial intelligence applications, such as, e.g., artificial neural networks, machine vision and machine learning applications, including through parallel processing techniques. In one or more examples, the AI accelerator 612 can include a graphics processing unit (GPU). The AI accelerator 612 can implement one or more components or features of the devices in the networked computing environment 100 and/or any of the components or methods described herein with reference to FIGS. 1-3, 4A-4B, and/or 5A-5B. In some examples the computing system 600 includes a second AI accelerator (not shown).

The interconnect 614 includes any one or more separate physical buses, point to point connections, or both connected by appropriate bridges, adapters, or controllers. The interconnect 614 can include, for example, a system bus, a Peripheral Component Interconnect (PCI) bus, a Hyper- Transport or industry standard architecture bus, a small computer system interface (SCSI) bus, a universal serial bus (USB), IIC (I2C) bus, or an Institute of Electrical and Electronics Engineers (IEEE) standard 694 bus (e.g., "Firewire"), or any other interconnect suitable for coupling or connecting the components of the computing system 600.

The user interface 616 includes code to present, on a display, information or screens for a user and to receive input (including commands) from a user via an input device. The display 620 can be any type of device for presenting visual information, such as a computer monitor, a flat panel display, or a mobile device screen, and can include a liquid crystal display (LCD), a light-emitting diode (LED) display, a plasma panel, or a cathode ray tube display, etc. The display 620 can include a display interface for communicating with the display. In some examples, the display 620 can include a display interface for communicating with a display external to the computing system 600.

In some examples, one or more of the illustrative components of the computing system 600 can be incorporated (in whole or in part) within, or otherwise form a portion of, another component. For example, the memory 608, or portions thereof, can be incorporated within the processor 602. As another example, the user interface 616 can be incorporated within the processor 602 and/or code in the memory 608. In some examples, the computing system 600 can be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device. In some examples, the computing system 600, or portion thereof, is implemented in one or more modules as a set of logic instructions stored in at least one non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Embodiments of each of the above systems, devices, components and/or methods, including devices in the networked computing environment 100, the reporting dashboard 200, the process 300, the reporting dashboard 410, the method 500 (including components 500A, 500B and 500C), the system 600, and/or any other system components, can be implemented in hardware, software, or any suitable combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Alternatively, or additionally, all or portions of the foregoing systems and/or components and/or methods can be implemented in one or more modules as a set of program or logic instructions stored in a machine- or computer-readable storage medium such as RAM, ROM, PROM, firmware, flash memory, etc., to be executed by a processor or computing device. For example, computer program code to carry out the operations of the components can be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Additional Notes and Examples

Example M1 includes a computer-implemented method of generating a video presentation, comprising determining a plurality of insights, each insight associated with a respective one of a plurality of data presentations and based on at least a portion of therapy compliance data for a patient, determining, for each of the plurality of insights, an insight location for the respective insight on a reporting dashboard, and an avatar position for an avatar on the reporting dashboard, formulating a feedback message for each of the plurality of insights, and generating a video presentation based on the reporting dashboard, the video presentation including a display of the plurality of data presentations and a display of an animation sequence for the avatar, the animation sequence including, for each of the plurality of insights, a display of the avatar at the respective avatar position, the avatar pointing to the insight location for the respective insight, and a synchronized audio signal representing the feedback message for the respective insight.

Example M2 includes the method of Example M1, wherein the respective avatar position is determined based on one or more of an avatar size, a type of the respective one of the plurality of data presentations, the insight location for the respective insight, an amount of free space in the reporting dashboard, or a location of free space in the reporting dashboard.

Example M3 includes the method of Example M1 or M2, wherein determining each of the plurality of insights comprises retrieving a plurality of predetermined statements based on a type of the respective one of the plurality of data presentations, determining, for each of the plurality of predetermined statements, a confidence score representing a probability that the respective statement is true based on the therapy compliance data, and selecting the respective statement having the highest confidence score.

Example M4 includes the method of Example M1, M2 or M3, further comprising assigning a weight to each respective insight of the plurality of insights, and determining an order of presentation in the animation sequence for the plurality of insights based on the weight assigned to each respective insight.

Example M5 includes the method of any of Examples M1-M4, wherein the weight assigned to each respective insight of the plurality of insights is based on one or more of a condition of the patient, a change in the therapy compliance data for the patient, a relevance of the insight to the behavior or overall therapy compliance data for the patient, whether the insight reflects a positive, neutral or negative report, or a confidence score for the insight.

Example M6 includes the method of any of Examples M1-M5, wherein each respective feedback message is formulated based on one or more of a predetermined feedback message or natural language modeling applied to the insight.

Example M7 includes the method of any of Examples M1-M6, wherein the video presentation further includes an interactive dialog portion including providing a prompt to a user, and receiving a user response to the prompt.

Example M8 includes the method of any of Examples M1-M7, wherein the video presentation is modified based on the user response to the prompt.

Example S1 includes a computing system comprising a processor, and a memory coupled to the processor, the memory comprising instructions which, when executed by the processor, cause the computing system to perform operations comprising determining a plurality of insights, each insight associated with a respective one of a plurality of data presentations and based on at least a portion of therapy compliance data for a patient, determining, for each of the plurality of insights, an insight location for the respective insight on a reporting dashboard, and an avatar position for an avatar on the reporting dashboard, formulating a feedback message for each of the plurality of insights, and generating a video presentation based on the reporting dashboard, the video presentation including a display of the plurality of data presentations and a display of an animation sequence for the avatar, the animation sequence including, for each of the plurality of insights, a display of the avatar at the respective avatar position, the avatar pointing to the insight location for the respective insight, and a synchronized audio signal representing the feedback message for the respective insight.

Example S2 includes the system of Example S1, wherein the respective avatar position is determined based on one or more of an avatar size, a type of the respective one of the plurality of data presentations, the insight location for the respective insight, an amount of free space in the reporting dashboard, or a location of free space in the reporting dashboard.

Example S3 includes the system of Example S1 or S2, wherein determining each of the plurality of insights comprises retrieving a plurality of predetermined statements based on a type of the respective one of the plurality of data presentations, determining, for each of the plurality of predetermined statements, a confidence score representing a probability that the respective statement is true based on the therapy compliance data, and selecting the respective statement having the highest confidence score.

Example S4 includes the system of Example S1, S2, or S3, wherein the instructions, when executed by the processor, cause the computing system to perform further operations comprising assigning a weight to each respective insight of the plurality of insights, and determining an order of presentation in the animation sequence for the plurality of insights based on the weight assigned to each respective insight.

Example S5 includes the system of any of Examples S1-S4, wherein the weight assigned to each respective insight of the plurality of insights is based on one or more of a condition of the patient, a change in the therapy compliance data for the patient, a relevance of the insight to the behavior or overall therapy compliance data for the patient, whether the insight reflects a positive, neutral or negative report, or a confidence score for the insight.

Example S6 includes the system of any of Examples S1-S5, wherein each respective feedback message is formulated based on one or more of a predetermined feedback message or natural language modeling applied to the insight.

Example S7 includes the system of any of Examples S1-S6, wherein the video presentation further includes an interactive dialog portion including providing a prompt to a user, and receiving a user response to the prompt.

Example S8 includes the system of any of Examples S1-S7, wherein the video presentation is modified based on the user response to the prompt.

Example C1 includes at least one non-transitory computer readable storage medium comprising instructions which, when executed by a computing system, cause the computing system to perform operations comprising determining a plurality of insights, each insight associated with a respective one of a plurality of data presentations and based on at least a portion of therapy compliance data for a patient, determining, for each of the plurality of insights, an insight location for the respective insight on a reporting dashboard, and an avatar position for an avatar on the reporting dashboard, formulating a feedback message for each of the plurality of insights, and generating a video presentation based on the reporting dashboard, the video presentation including a display of the plurality of data presentations and a display of an animation sequence for the avatar, the animation sequence including, for each of the plurality of insights, a display of the avatar at the respective avatar position, the avatar pointing to the insight location for the respective insight, and a synchronized audio signal representing the feedback message for the respective insight.

Example C2 includes the at least one non-transitory computer readable storage medium of Example C1, wherein the respective avatar position is determined based on one or more of an avatar size, a type of the respective one of the plurality of data presentations, the insight location for the respective insight, an amount of free space in the reporting dashboard, or a location of free space in the reporting dashboard.

Example C3 includes the at least one non-transitory computer readable storage medium of Example C1 or C2, wherein determining each of the plurality of insights comprises retrieving a plurality of predetermined statements based on a type of the respective one of the plurality of data presentations, determining, for each of the plurality of predetermined statements, a confidence score representing a probability that the respective statement is true based on the therapy compliance data, and selecting the respective statement having the highest confidence score.

Example C4 includes the at least one non-transitory computer readable storage medium of Example C1, C2 or C3, wherein the instructions, when executed by the processor, cause the computing system to perform further operations comprising assigning a weight to each respective insight of the plurality of insights, and determining an order of presentation in the animation sequence for the plurality of insights based on the weight assigned to each respective insight.

Example C5 includes the at least one non-transitory computer readable storage medium of any of Examples C1-C4, wherein the weight assigned to each respective insight of the plurality of insights is based on one or more of a condition of the patient, a change in the therapy compliance data for the patient, a relevance of the insight to the behavior or overall therapy compliance data for the patient, whether the insight reflects a positive, neutral or negative report, or a confidence score for the insight.

Example C6 includes the at least one non-transitory computer readable storage medium of any of Examples C1-C5, wherein each respective feedback message is formulated based on one or more of a predetermined feedback message or natural language modeling applied to the insight.

Example C7 includes the at least one non-transitory computer readable storage medium of any of Examples C1-C6, wherein the video presentation further includes an interactive dialog portion including providing a prompt to a user, and receiving a user response to the prompt.

Example C8 includes the at least one non-transitory computer readable storage medium of any of Examples C1-C7, wherein the video presentation is modified based on the user response to the prompt.

Example A1 includes an apparatus comprising means for performing the method of any of Examples M1-M8.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computer-implemented method of generating a video presentation, comprising:

determining a plurality of insights, each insight associated with a respective one of a plurality of data presentations and based on at least a portion of therapy compliance data for a patient;

determining, for each of the plurality of insights:

an insight location for the respective insight on a reporting dashboard; and an avatar position for an avatar on the reporting dashboard;

formulating a feedback message for each of the plurality of insights; and generating a video presentation based on the reporting dashboard, the video presentation including a display of the plurality of data presentations and a display of an animation sequence for the avatar, the animation sequence including, for each of the plurality of insights:

a display of the avatar at the respective avatar position, the avatar pointing to the insight location for the respective insight, and a synchronized audio signal representing the feedback message for the respective insight, and wherein the avatar is positioned such that, when pointing to the data presentation, the relevant portion of the data presentation being discussed remains clear and unobstructed to a user;

wherein the video presentation further includes an embedded interactive dialog portion comprising:

providing a prompt to the user and receiving a user response to the prompt, wherein, in response to the user response, at least a remaining portion of the video presentation is automatically regenerated or modified in real time such that subsequent content, avatar actions, or feedback messages are dynamically updated based on the user's input.

2. The method of claim 1, wherein the respective avatar position is determined based on one or more of an avatar size, a type of the respective one of the plurality of data presentations, the insight location for the respective insight, an amount of free space in the reporting dashboard, or a location of free space in the reporting dashboard.

3. The method of claim 1, wherein determining each of the plurality of insights comprises:

retrieving a plurality of predetermined statements based on a type of the respective one of the plurality of data presentations;

determining, for each of the plurality of predetermined statements, a confidence score representing a probability that the respective statement is true based on the therapy compliance data; and selecting the respective statement having the highest confidence score.

4. The method of claim 1, further comprising:

assigning a weight to each respective insight of the plurality of insights; and determining an order of presentation in the animation sequence for the plurality of insights based on the weight assigned to each respective insight.

5. The method of claim 4, wherein the weight assigned to each respective insight of the plurality of insights is based on one or more of a condition of the patient, a change in the therapy compliance data for the patient, a relevance of the insight to the behavior of overall therapy.

6. The method of claim 1, wherein each respective feedback message is formulated based on one or more of a predetermined feedback message or natural language modeling applied to the insight.

7. A computing system comprising:

a processor; and a memory coupled to the processor, the memory comprising instructions which, when executed by the processor, cause the computing system to perform operations comprising:

determining a plurality of insights, each insight associated with a respective one of a plurality of data presentations and based on at least a portion of therapy compliance data for a patient;

determining, for each of the plurality of insights: an insight location for the respective insight on a reporting dashboard; and an avatar position for an avatar on the reporting dashboard;

formulating a feedback message for each of the plurality of insights; and generating a video presentation based on the reporting dashboard, the video presentation including a display of the plurality of data presentations and a display of an animation sequence for the avatar, the animation sequence including, for each of the plurality of insights:

a display of the avatar at the respective avatar position, the avatar pointing to the insight location for the respective insight, and a synchronized audio signal representing the feedback message for the respective insight, and wherein the avatar is positioned such that, when pointing to the data presentation, the relevant portion of the data presentation being discussed remains clear and unobstructed to a user;

wherein the video presentation further includes an embedded interactive dialog portion comprising:

providing a prompt to the user and receiving a user response to the prompt, wherein, in response to the user response, at least a remaining portion of the video presentation is automatically regenerated or modified in real time such that subsequent content, avatar actions, or feedback messages are dynamically updated based on the user's input.

8. The system of claim 7, wherein the respective avatar position is determined based on one or more of an avatar size, a type of the respective one of the plurality of data presentations, the insight location for the respective insight, an amount of free space in the reporting dashboard, or a location of free space in the reporting dashboard.

9. The system of claim 7, wherein determining each of the plurality of insights comprises:

retrieving a plurality of predetermined statements based on a type of the respective one of the plurality of data presentations;

determining, for each of the plurality of predetermined statements, a confidence score representing a probability that the respective statement is true based on the therapy compliance data; and selecting the respective statement having the highest confidence score.

10. The system of claim 7, wherein the instructions, when executed by the processor, cause the computing system to perform further operations comprising:

assigning a weight to each respective insight of the plurality of insights; and determining an order of presentation in the animation sequence for the plurality of insights based on the weight assigned to each respective insight, wherein the weight assigned to each respective insight of the plurality of insights is based on one or more of a condition of the patient, a change in the therapy compliance data for the patient, a relevance of the insight to the behavior or overall therapy compliance data for the patient, whether the insight reflects a positive, neutral or negative report, or a confidence score for the insight, wherein each respective feedback message is formulated based on one or more of a predetermined feedback message or natural language modeling applied to the insight.

11. At least one non-transitory computer readable storage medium comprising instructions which, when executed by a computing system, cause the computing system to perform operations comprising:

determining a plurality of insights, each insight associated with a respective one of a plurality of data presentations and based on at least a portion of therapy compliance data for a patient;

determining, for each of the plurality of insights:

an insight location for the respective insight on a reporting dashboard, and an avatar position for an avatar on the reporting dashboard;

formulating a feedback message for each of the plurality of insights; and generating a video presentation based on the reporting dashboard, the video presentation including a display of the plurality of data presentations and a display of an animation sequence for the avatar, the animation sequence including, for each of the plurality of insights:

a display of the avatar at the respective avatar position, the avatar pointing to the insight location for the respective insight, and a synchronized audio signal representing the feedback message for the respective insight, wherein the avatar is positioned such that, when pointing to the data presentation, the relevant portion of the data presentation being discussed remains clear and unobstructed to a user;

wherein the video presentation further includes an embedded interactive dialog portion comprising:

providing a prompt to the user and receiving a user response to the prompt, wherein, in response to the user response, at least a remaining portion of the video presentation is automatically regenerated or modified in real time such that subsequent content, avatar actions, or feedback messages are dynamically updated based on the user's input.

12. The at least one non-transitory computer readable storage medium of claim 11, wherein the respective avatar position is determined based on one or more of an avatar size, a type of the respective one of the plurality of data presentations, the insight location for the respective insight, an amount of free space in the reporting dashboard, or a location of free space in the reporting dashboard.

13. The at least one non-transitory computer readable storage medium of claim 11, wherein determining each of the plurality of insights comprises:

retrieving a plurality of predetermined statements based on a type of the respective one of the plurality of data presentations;

determining, for each of the plurality of predetermined statements, a confidence score representing a probability that the respective statement is true based on the therapy compliance data; and selecting the respective statement having the highest confidence score.

14. The at least one non-transitory computer readable storage medium of claim 11, wherein the instructions, when executed by the processor, cause the computing system to perform further operations comprising:

assigning a weight to each respective insight of the plurality of insights; and determining an order of presentation in the animation sequence for the plurality of insights based on the weight assigned to each respective insight, wherein the weight assigned to each respective insight of the plurality of insights is based on one or more of a condition of the patient, a change in the therapy compliance data for the patient, a relevance of the insight to the behavior or overall therapy compliance data for the patient, whether the insight reflects a positive, neutral or negative report, or a confidence score for the insight, wherein each respective feedback message is formulated based on one or more of a predetermined feedback message or natural language modeling applied to the insight.

* * * * *